United States Patent [19]

Mikami

[11] Patent Number: 5,767,892
[45] Date of Patent: Jun. 16, 1998

[54] IMAGE RECORDING APPARATUS CAPABLE OF RECORDING A PLURALITY OF IMAGES ON A RECORDING MEDIUM

[75] Inventor: Fumio Mikami, Chigasaki, Japan

[73] Assignee: Canon Kabushiki Kaisha, Tokyo, Japan

[21] Appl. No.: 5,553

[22] Filed: Jan. 19, 1993

[30] Foreign Application Priority Data

Jan. 20, 1992 [JP] Japan ................................. 4-007549

[51] Int. Cl.⁶ ...................... B41J 2/435; G01D 15/24; H01S 1/131; G11B 7/00
[52] U.S. Cl. ........................ 347/264; 347/262; 400/708; 400/120.03
[58] Field of Search ........................... 355/244, 203; 347/16, 262, 264, 153; 346/1.1, 140; 400/708, 120.03, 636, 636.2

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,910,552 | 3/1990 | Migita et al. | 399/19 |
| 4,975,780 | 12/1990 | Kuboki | 358/296 |
| 5,068,741 | 11/1991 | Takahashi | 358/296 |
| 5,138,342 | 8/1992 | Kurata et al. | 347/86 |
| 5,258,773 | 11/1993 | Arakawa et al. | 346/1.1 |

FOREIGN PATENT DOCUMENTS

| | | | |
|---|---|---|---|
| 3112275 | 1/1982 | Germany | G03B 27/50 |
| 3409771 | 9/1984 | Germany | H04N 1/46 |
| 3503555 | 9/1985 | Germany | G03F 1/00 |
| 56-138752 | 10/1981 | Japan | G03G 15/00 |
| 59-123670 | 7/1984 | Japan . | |
| 59-138461 | 8/1984 | Japan . | |
| 0028729 | 2/1987 | Japan | 355/244 |
| 0035380 | 2/1987 | Japan | 355/244 |
| 0160478 | 7/1987 | Japan | 355/244 |

*Primary Examiner*—Benjamin R. Fuller
*Assistant Examiner*—Raquel Yvette Gordon
*Attorney, Agent, or Firm*—Fitzpatrick, Cella, Harper & Scinto

[57] ABSTRACT

An image recording apparatus, which records an image on a recording medium by performing a sub-scan operation by conveying the recording medium by a predetermined amount upon completion of each main scan operation of a recording unit, is disclosed. The apparatus stops a convey operation of the recording medium after a first image is recorded on the recording medium. When a recording start command is generated within a predetermined period of time after the convey operation is stopped, a re-convey operation of the recording medium is started in response to this command, and a second image is recorded by the recording unit on the recording medium on which the first image is recorded. When the recording start command is not generated within the predetermined period of time, the recording medium on which the first image is recorded is automatically ejected.

A plurality of images can be synthesized on a single recording medium before the medium is ejected without using a large-capacity memory.

20 Claims, 8 Drawing Sheets

IMAGE RECORDING APPARATUS CAPABLE OF RECORDING A PLURALITY OF IMAGES ON A RECORDING MEDIUM

BACKGROUND OF THE INVENTION

1. Field of the Invention

The present invention relates to an image recording apparatus capable of recording a plurality of images on a recording medium.

2. Related Background Art

In a conventional copying machine having a printer mechanism as a combination of a light source such as a laser and an electrophotography process, it is impossible to stop image formation during image formation for one recording medium. For this reason, in order to form a plurality of images on a single recording medium, a plurality of images are read in advance, and are synthesized on an image memory. The synthesized images are supplied to the printer mechanism, thereby outputting the images during a single operation.

Therefore, a memory having a huge memory capacity for storing a plurality of images is required. For example, if 100 mm×100 mm image data is expressed in an 8-bit format at a density of 400 pixels/inch, a memory of about 2.5 Mbytes is required.

Furthermore, since a process apparatus for synthesizing images is also required, an apparatus for synthesizing the images becomes bulky, and cost is increased.

SUMMARY OF THE INVENTION

The present invention has been made in consideration of the above situation, and has as its object to provide an improved image recording apparatus.

It is another object of the present invention to provide an image recording apparatus, which can synthesize a plurality of images with a simple arrangement and at low cost.

It is still another object of the present invention to provide an image recording apparatus, which can synthesize a plurality of images without using a large-capacity memory.

It is still another object of the present invention to provide an image recording apparatus, which can synthesize and record a plurality of images on a single recording medium before the medium is ejected without synthesizing images on a memory.

It is still another object of the present invention to provide an image recording apparatus, which stops a conveying operation of a recording medium after recording of a first image on the recording medium is ended, and re-starts the conveying operation and records a second image according to a recording start command generated thereafter.

The above and other objects will become apparent from the following description taken in conjunction with the accompanying drawings.

DETAILED DESCRIPTION OF THE PREFERRED EMBODIMENTS

The preferred embodiments of the present invention will be described in detail hereinafter with reference to the accompanying drawings.

Figure 1:
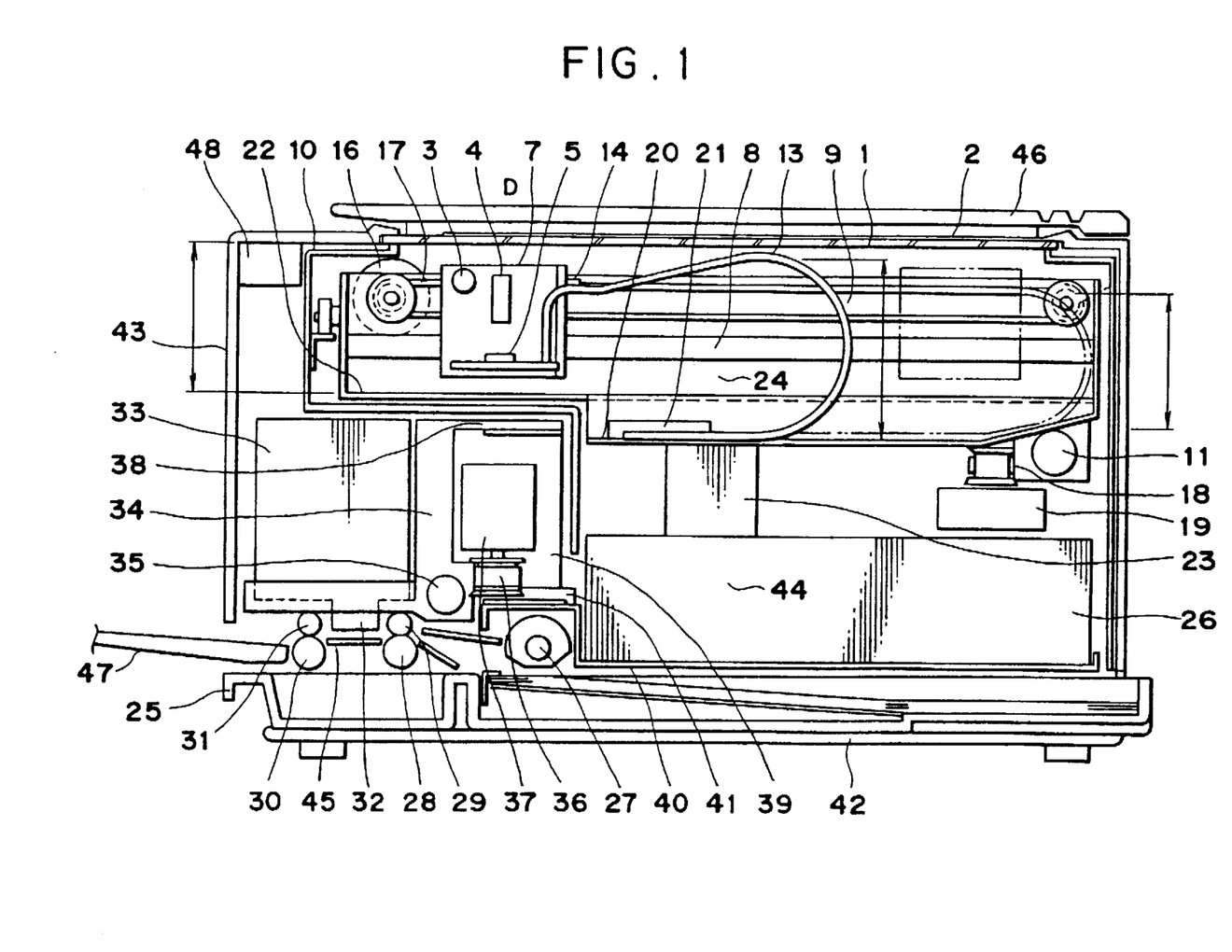
FIG. 1 is a sectional view showing an arrangement of a color copying machine, which adopts the present invention.

FIG. 1 is a sectional view of a color copying machine, which adopts an ink-jet recording method according to an embodiment of the present invention.

The color copying machine is constituted by an image reading & image process section (to be referred to as a reader unit hereinafter) 24, and a printer unit 44. The reader unit 24 reads an image while scanning an original 2 placed on an original table glass 1 using a CCD line sensor 5 (FIG. 2) having filters for three colors, i.e., R, G, and B colors, and the printer unit 44 records the read image on a recording sheet using four-color, i.e., cyan (C), magenta (M), yellow (Y), and black (Bk) ink-jet heads through an image process circuit.

The operation will be described in detail below.

The reader unit 24 consists of members 1 to 5, 7 to 11, 12, 14 and 16–23 and the printer unit 44 consists of members 25 to 43. In this arrangement, the upper left side in FIG. 1 corresponds to the front surface.

The printer unit 44 comprises ink-jet heads (recording heads) 32 for performing recording by discharging ink droplets. Each recording head 32 has 128 nozzles aligned in the longitudinal direction (sub-scan direction to be described later) at a pitch of 63.5 µm, and can record a line having a width of 8.128 mm at a time. In this embodiment, the recording head is of a type for discharging ink droplets from the nozzles by causing a change in state in an ink by heat energy. Therefore, when recording is performed on a recording sheet, an 8.128-mm wide image is recorded, and thereafter, the recording sheet is fed by 8.128 mm to prepare for the next recording. Thus, this process is repeated. In the following description, the recording direction of this recording head will be referred to as a main scan direction hereinafter, and a paper feed direction perpendicular to the recording direction will be referred to as a sub-scan direction hereinafter. In FIG. 1, the direction perpendicular to the plane of drawing is the main scan direction, and the right-and-left direction with respect to the plane of drawing is the sub-scan direction.

The reader unit 24 repetitively reads the original 2 by a width of 8.128 mm in correspondence with the printer unit 44. In this case, the reading direction will be referred to as a main scan direction hereinafter, and the moving direction for the next reading will be referred to as a sub-scan direction hereinafter. In this arrangement, the main scan direction corresponds to the right-and-left direction of FIG. 1, and the sub-scan direction corresponds to the direction perpendicular to the plane of drawing of FIG. 1.

The operation of the reader unit 24 will be described below.

The original 2 on the original table glass 1 is irradiated with light emitted from a lamp 3 on a main scan carriage 7, and an optical image is guided to the light-sensitive element 5 (CCD line sensor) via a lens array 4. The main scan carriage 7 is slidably fitted on a main scan rail 8 on a sub-scan unit 9. Furthermore, the main scan carriage 7 is coupled to a main scan belt 17 via an engaging member (not shown), and is moved in the right-and-left direction in FIG. 1 to perform a main scan operation upon rotation of a main scan motor 16.

The sub-scan unit 9 is slidably fitted on a sub-scan rail 11 fixed to an optical frame 10. Furthermore, since the sub-scan unit 9 is coupled to a sub-scan belt 18 via an engaging member (not shown), it is moved in a direction perpendicular to the plane of drawing of FIG. 1 to perform a sub-scan operation upon rotation of a sub-scan motor 19.

In this manner, an image signal read by the CCD 5 is supplied to the sub-scan unit 9 through a looped signal cable 13. One end of the signal cable 13 is received by a receiving portion 14, and the other end thereof is fixed to a bottom surface 20 of the sub-scan unit 9 by a member 21 and is coupled to a sub-scan signal cable 23 for coupling between the sub-scan unit 9 and an electrical unit 26 of the printer unit 44. The signal cable 13 follows the movement of the main scan carriage 7, and the sub-scan signal cable 23 follows the movement of the sub-scan unit 9.

The operation of the printer unit 44 will be described below.

A recording sheet (cut sheet) fed one by one from a recording paper cassette 25 by a paper feed roller 27 driven by a power source (not shown) is subjected to recording by the recording heads 32 on a platen 45 between two pairs of rollers 28 and 29, and 30 and 31. Each recording head 32 is integrated with an ink tank 33, and is detachably mounted on a printer main scan carriage 34. The printer main scan carriage 34 is slidably fitted on a printer main scan rail 35.

Furthermore, since the printer main scan carriage 34 is coupled to a main scan belt 36 through an engaging member (not shown), it is moved in a direction perpendicular to the plane of drawing of FIG. 1 to perform a main scan operation upon rotation of a main scan motor 37.

The printer main scan carriage 34 has an arm portion 38, to which a printer signal cable 39 for transmitting a signal to the recording heads 32 is fixed. The other end of the printer signal cable 39 is fixed to a printer inner plate 40 by a member 41, and is further coupled to the electrical unit 26. The printer signal cable 39 follows the movement of the printer main scan carriage 34 so as not to contact the optical frame 10 thereabove.

The sub-scan operation of the printer unit 44 is attained by moving the recording sheet by 8.128 mm by rotating the two pairs of rollers 28 and 29, and 30 and 31 by a power source (not shown). The printer unit 44 also includes a bottom plate 42 of the printer unit 44, an outer casing 43, an original pressure plate 46, a paper ejection tray 47, and electrical components 48 of a console unit.

Figure 2:
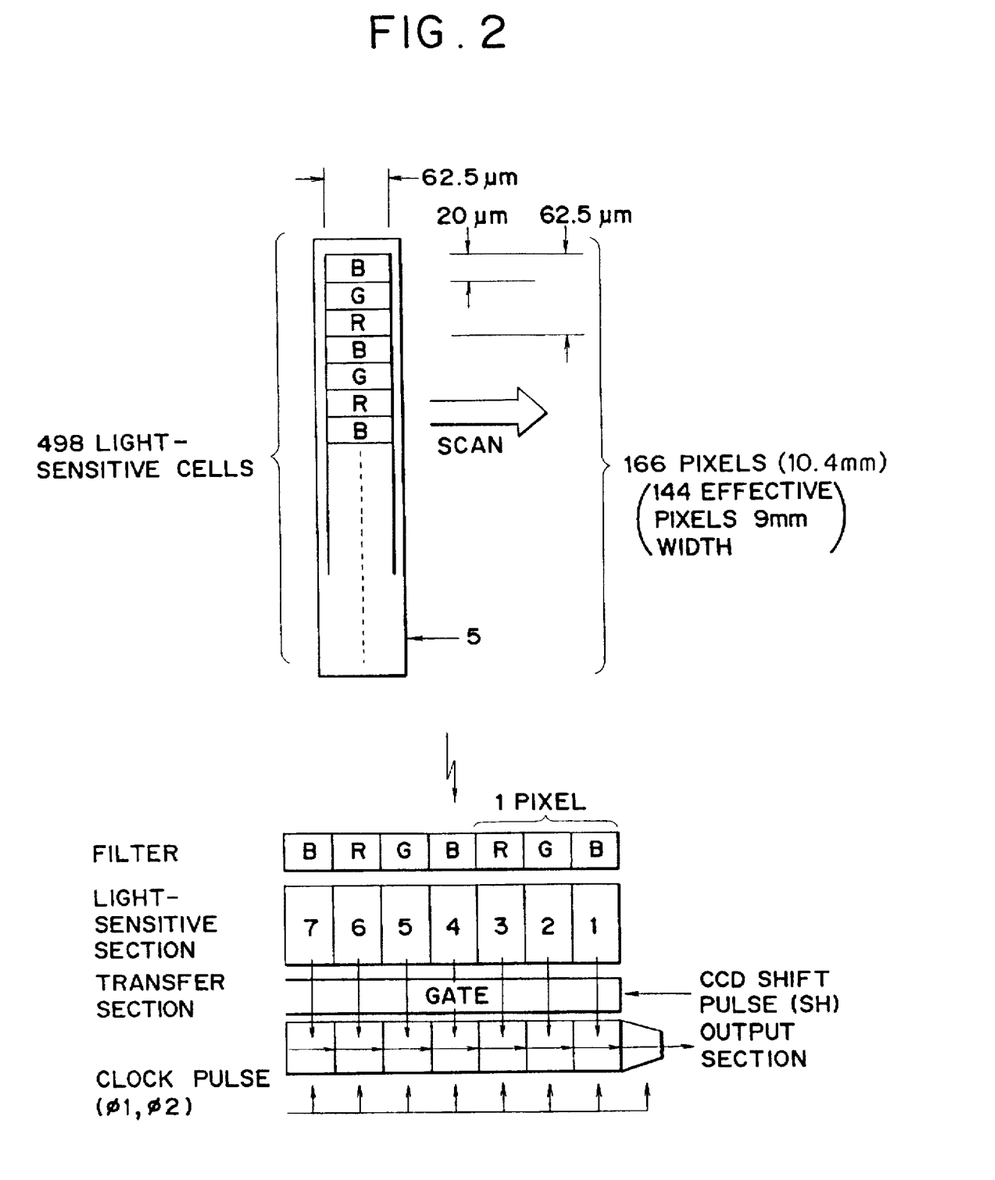
FIG. 2 is a view showing a CCD line sensor.

FIG. 2 shows the details of the CCD line sensor 5 of this embodiment. The line sensor 5 comprises linearly aligned 498 light-sensitive cells, and since three, i.e., R, G, and B pixels constitute one pixel, the sensor 5 can read 166 pixels in practice. Of these pixels, the number of effective pixels is 144, and a pixel width consisting of these pixels is about 9 mm.

Figure 3A:
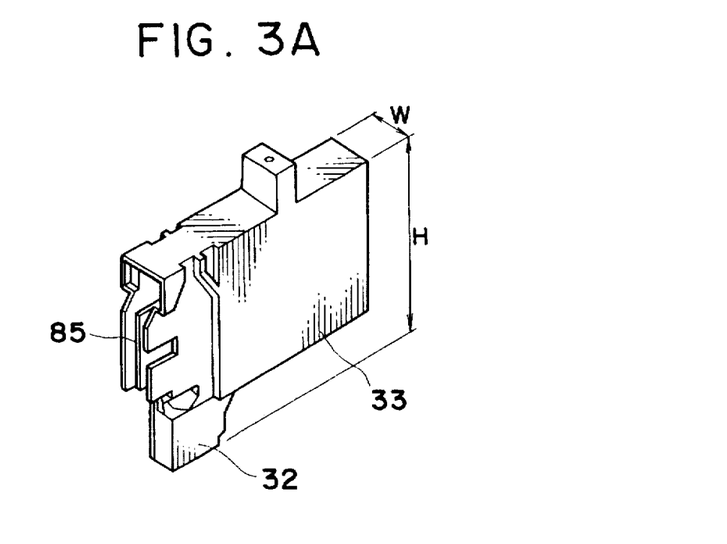
FIGS. 3A and 3B are views for explaining an ink-jet recording head.
Figure 3B:
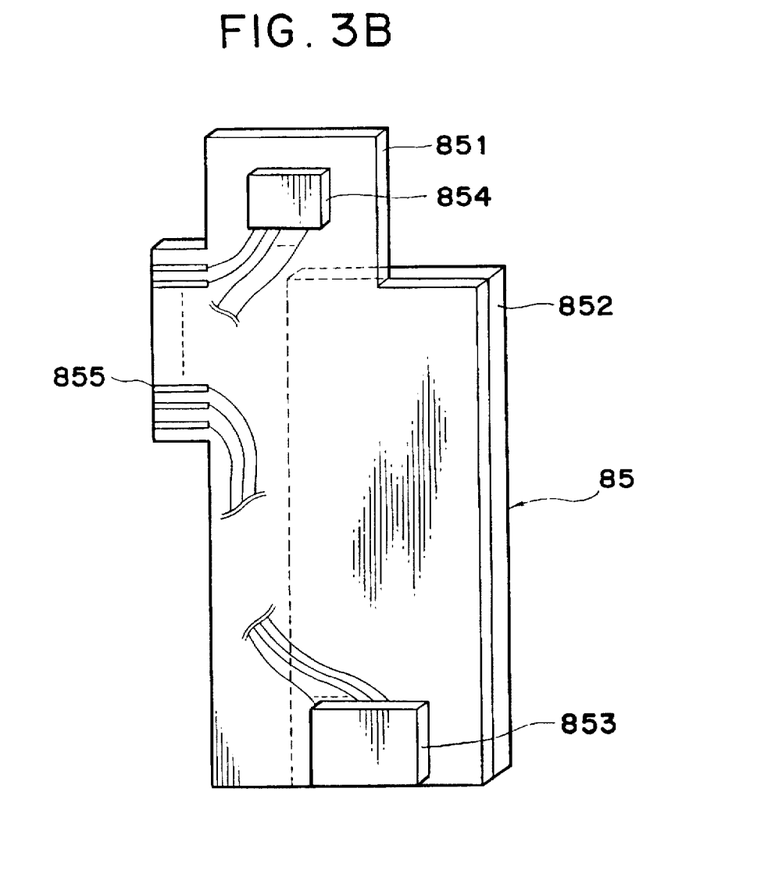

FIG. 3A shows an outer appearance of an ink-jet cartridge in the printer unit 44 of the color copying machine of this embodiment. FIG. 3B shows the details of a printed board 85 shown in FIG. 3A.

In FIG. 3B, the printed circuit board 85 includes a printed circuit board 851, an aluminum heat dissipation plate 852, a heater board 853 constituted by heat generating elements and a diode matrix, an EEPROM (nonvolatile memory) 854, which pre-stores density nonuniformity information, and contact electrodes 855 serving as a joint portion to a main body. FIG. 3B does not illustrate linearly aligned ejection orifices.

Figure 4:
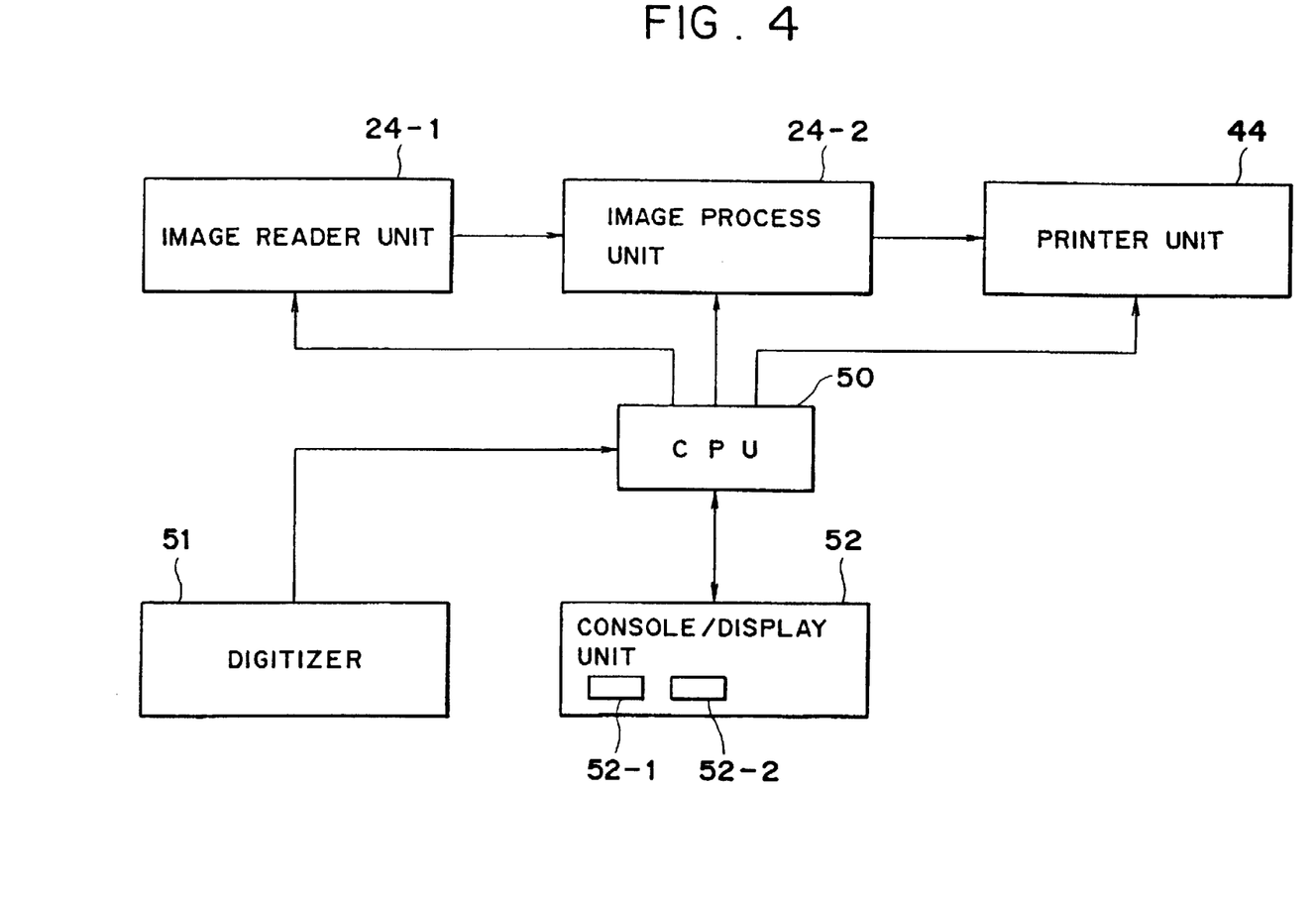
FIG. 4 is a block diagram showing a control section of the color copying machine shown in FIG. 1.

FIG. 4 is a block diagram showing a control section of the color copying machine shown in FIG. 1. In FIG. 4, the control section includes an image reader 24-1 in the reader unit 24 (FIG. 1), an image process unit 24-2 in the reader unit 24 (FIG. 1), the ink-jet printer unit 44 (FIG. 1), and a CPU 50, mainly constituted by a ROM, a RAM, a microcomputer, and the like, for controlling various operations of the reader unit 24 and the printer unit 44. The control section also includes a digitizer 51 for designating a desired region of an original image to be copied, and a console/display unit 52 having a copy start key 52-1, a filing mode selection key 52-2, various mode selection keys, and a display for displaying an operation guide.

An original image on the original table glass 1 is read by the image reader 24-1. The multi-value image data is binarized by the image process unit 24-2, and the binary image is supplied to the printer unit 44. The printer unit 44 has a print mechanism for discharging ink droplets from nozzles by causing a change in state in an ink using heat energy, as described above, and outputs a binary image according to input binary data. One scan operation of the image reader 24-1 and the printer unit 44 has a 128-dot width at 400 dots/inch (400 DPI). Image formation is attained by sequentially repeating the serial scan operation of the image reader 24-1 and the printer unit 44.

Figure 5A:
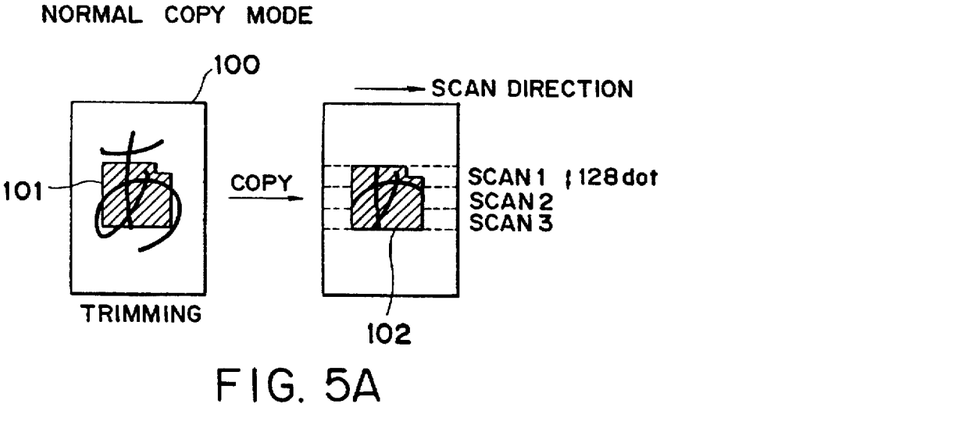
FIGS. 5A–5B are views for explaining image formation processes executed when a filing copy operation is performed using a plurality of different originals.

FIGS. 5A–5B-3 show image formation processes in a normal copy mode and a filing copy mode. These modes will be described below with reference to FIGS. 5A–5B-3.

When an image trimming operation is to be performed in the normal copy mode, an original 100 is set on the digitizer 51, and a desired trimming area 101 is input. Thereafter, the original 100 is set on the original table glass 1, and the copy start key of the console/display unit 52 is then turned on to start a copy operation. Thus, a copied image 102 according to the designated trimming area on the original is formed on a single copy sheet (recording sheet) by three serial scan operations in this case, and the copy sheet is ejected.

Figures 5B, 5B, 5B:
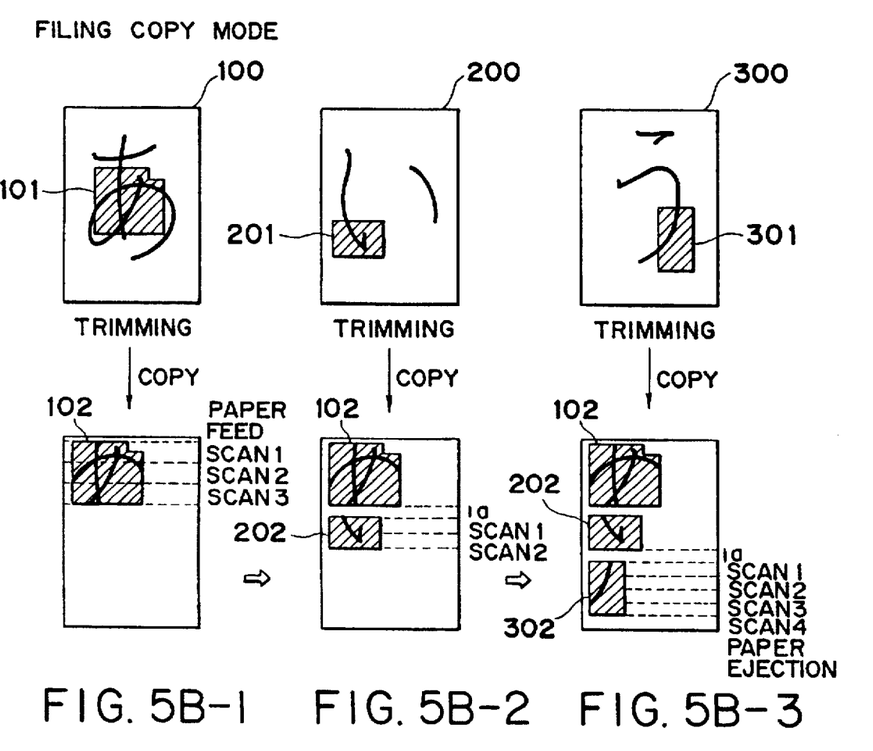

A case will be described below wherein images extracted by trimming are copied in the filing copy mode. When a filing mode is designated by the filing mode selection key 52-2 on the console/display unit 52, the desired area 101 on the original 100 is input as in the normal copy mode, and the original is set on the original table glass 1. Thereafter, the copy start key 52-1 is turned on to start a filing copy operation. In the first copy process, an image according to the input trimming area is formed by three serial scan copy operations, as shown in FIG. 5B-1. However, the copy sheet is not ejected, and remains on the platen 45. At this time, when the copy start key 52-1 is not operated for a predetermined period of time (e.g., 10 minutes), the copy sheet is automatically ejected so as to prevent the two pairs of rollers 28 and 29, and 30 and 31 from being deformed.

When the next copy operation is performed using another original, an operation guide for clearing parameters set for the current copy mode, and setting a trimming area 201 for the new original, and various new image formation parameters such as color adjustment parameters is displayed on the console/display unit 52. After the current mode is cleared by an operation of an operator, the original is exchanged, and a new copy mode is re-set by various mode keys. A new copy mode may be set by calling a mode memory which is allocated on the internal RAM of the CPU 50, and stores copy modes. When the content of the mode memory is a non-filing mode, an operation guide for urging an operator to select whether the copy sheet is ejected, and the called mode is set, or the called mode is canceled is displayed on the console/display unit 52.

When the filing copy mode is to be ended, the copy sheet remaining in the copying machine is ejected by operating a predetermined key indicated by an operation guide display in the console/display unit.

In this embodiment, the original is exchanged with an original 200, and a trimming area 201 is designated by the digitizer 51.

When the copy start key 52-1 is turned on, the second copy process is started. As shown in FIG. 5B-2, the copy sheet is fed by a predetermined amount a, and an image 202 according to the trimming area 201 is formed by two serial scan operations. The copy sheet is not ejected, and remains on the platen 45.

In the third copy process, the same process as in the second copy process is performed, and thereafter, a copy operation is performed for an original 300. As shown in FIG. 5B-3, the copy sheet is fed by the predetermined amount a, and an image 302 according to a trimming area 301 is formed by four serial scan operations. Thereafter, since there is no more print margin, the copy sheet is ejected.

Figure 6:
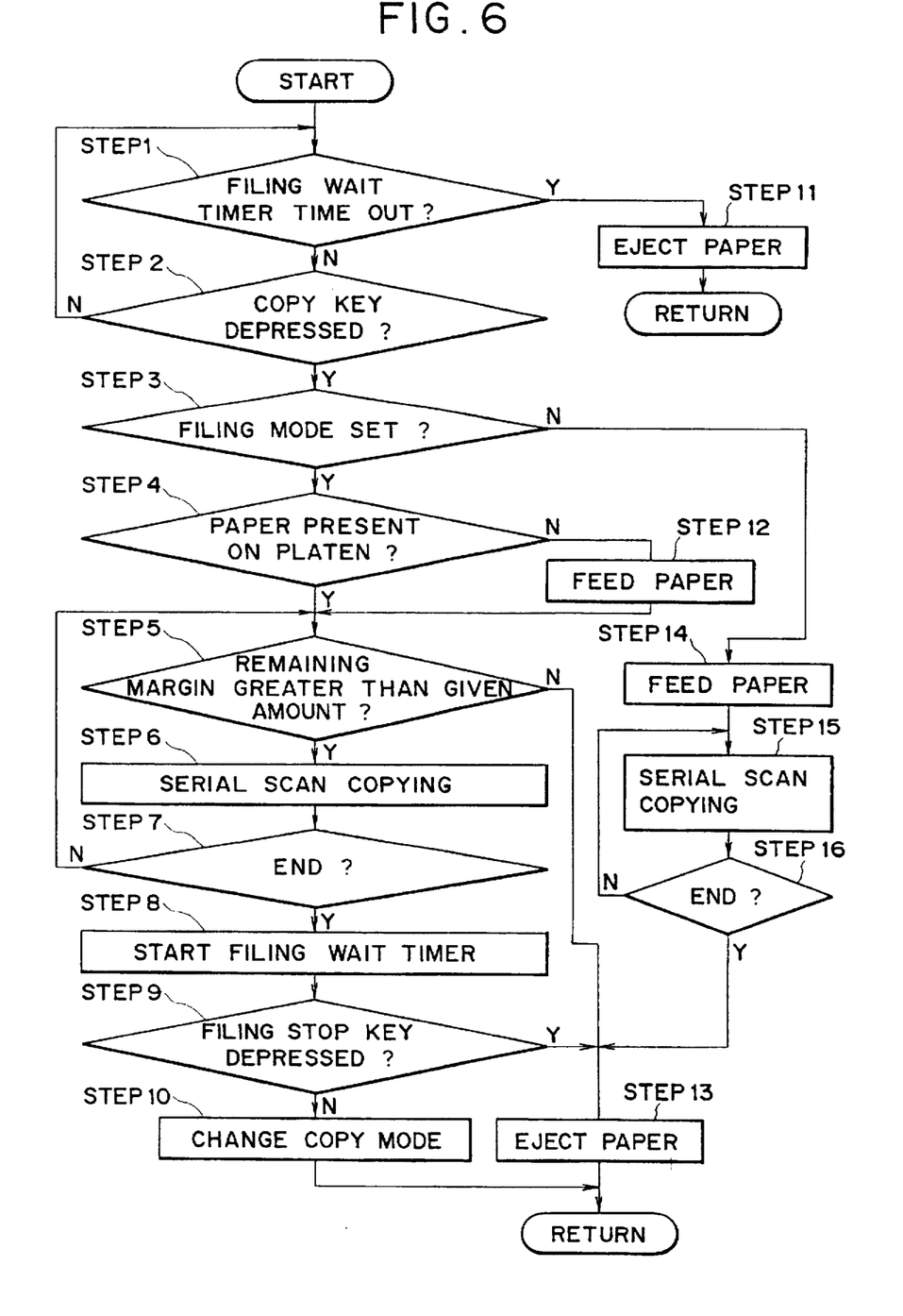
FIG. 6 is a flow chart showing the control flow in this embodiment.

The control flow of this embodiment will be described below.

In step 1, a filing wait timer allocated on a predetermined area of the internal RAM of the CPU 50 is checked. If the timer has reached a time-out state, a copy sheet is ejected in step 11.

In step 2, it is checked if the copy start key 52-1 is depressed.

In step 3, it is checked if the filing mode is set. If the filing mode is set, the flow advances to step 4; otherwise, the flow advances to step 14 to execute the normal copy mode.

In step 4, it is checked if the copy sheet remains on the platen 45. If no copy sheet remains on the platen 45, another copy sheet is fed from the recording paper cassette 25 onto the platen 45 in step 12.

In step 5, the presence/absence of the remaining margin for serial scan copy operations of the copy sheet is checked. If the remaining margin is greater than a given amount, one serial scan copy operation is performed in step 6. However, if the copy sheet has no remaining margin, it is ejected in step 13.

In step 7, it is checked if the copy operation is ended. If the copy operation is not ended, the flow returns to step 5 to execute the same process as described above; otherwise, the flow advances to step 8.

In step 8, the above-mentioned filing wait timer is started.

In step 9, it is checked if a filing stop key is depressed. If the filing stop key is depressed, the flow advances to step 13 to eject the copy sheet. If the filing stop key is not depressed, the flow advances to step 10.

Step 14 and subsequent steps correspond to a normal copy mode sequence. In step 14, a copy sheet is fed from the recording paper cassette 25.

In step 15, one serial scan copy operation is performed, and step 15 is repeated until it is determined in step 16 that the copy operation is ended.

If it is determined that the copy operation is ended, the flow advances to step 13 to eject the copy sheet on the platen 45.

In this manner, images extracted from a plurality of different originals by trimming can be copied onto a single sheet, the sheet can be effectively used, and originals need not be cut and pasted.

(Second Embodiment)

The second embodiment of the present invention will be described below. In the above embodiment, trimming images on different originals are formed on a single copy sheet. However, in this embodiment, a plurality of images according to image data from a still video player for reproducing images photographed by a still video camera, and stored in a storage medium such as a floppy disk, are formed on a single copy sheet.

Figures 7A, 7B:
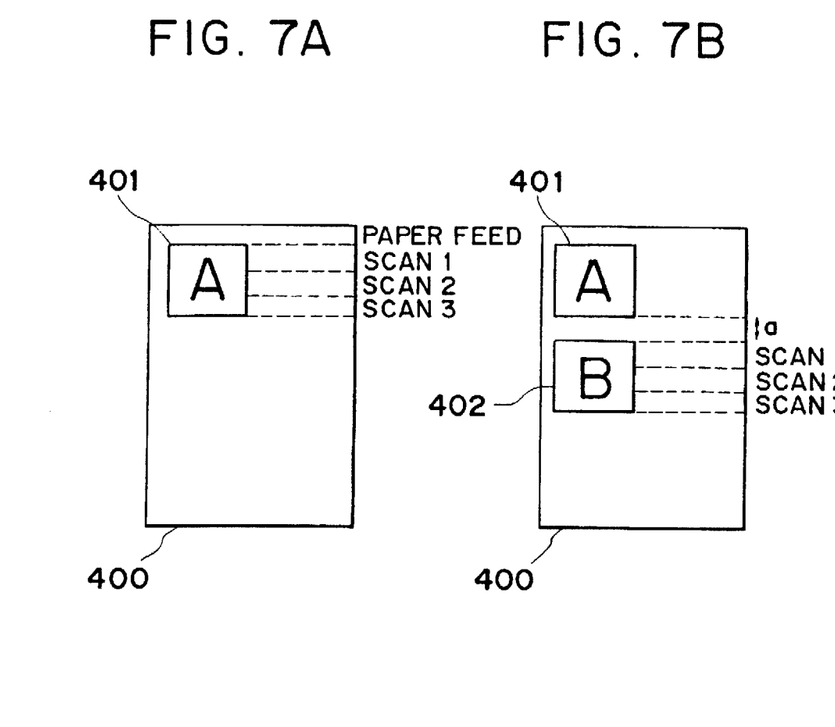
FIGS. 7A to 7C are views for explaining image formation processes executed when a filing copy operation is performed on the basis of an image output from a still video player.
Figure 7C:
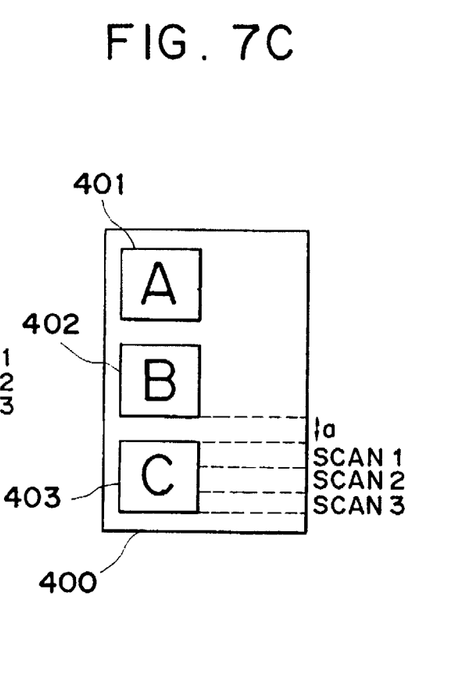
Figure 8:
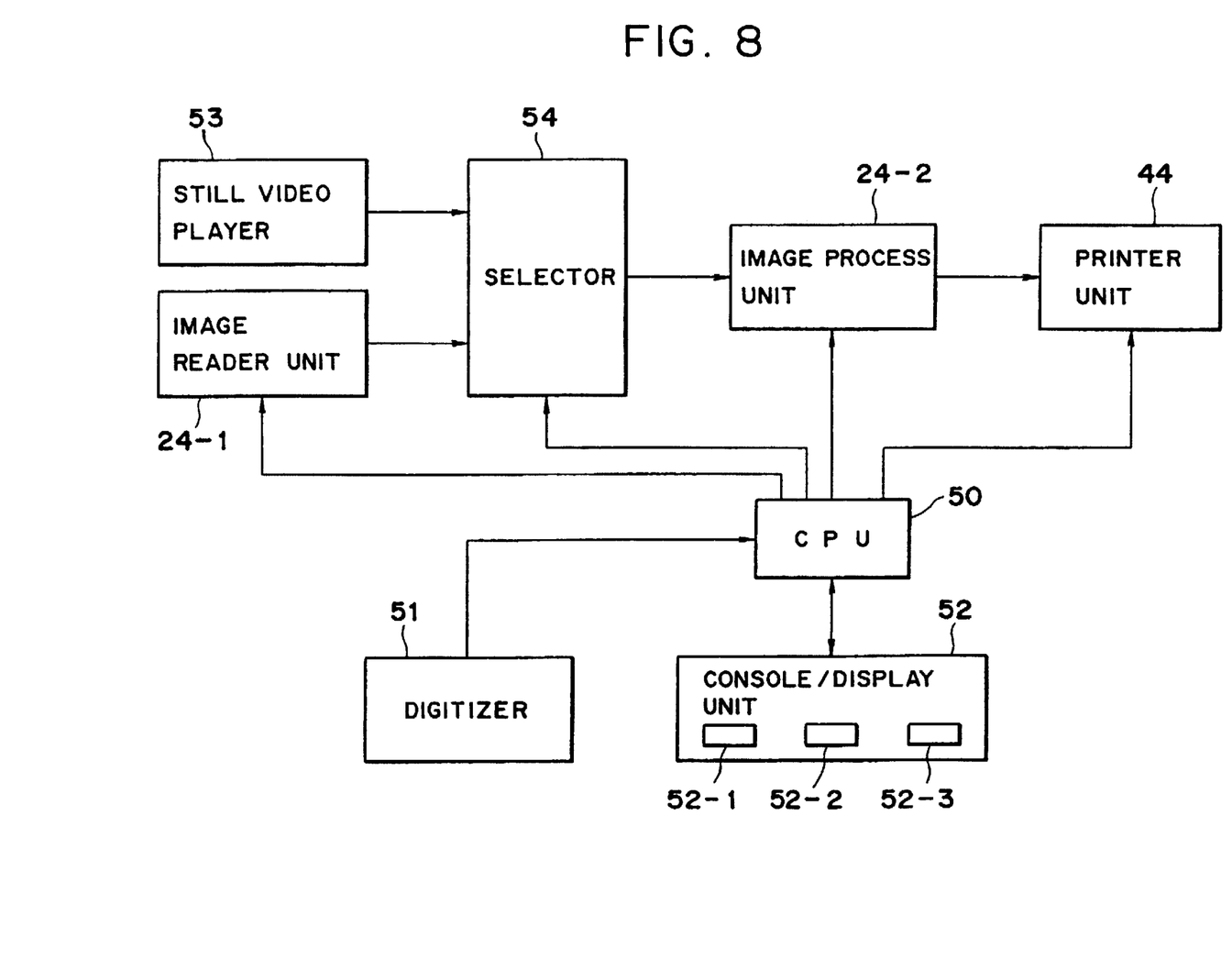
FIG. 8 is a block diagram showing another embodiment of a control section of a color copying machine.

FIGS. 7A to 7C are views for explaining filing copy image formation processes in this embodiment, and FIG. 8 is a block diagram showing a control section of this embodiment.

The same reference numerals in FIG. 8 denote the same parts as in FIG. 4. In FIG. 8, a still video player 53 outputs digital image data, and a selector 54 selects input image data. When the input of the selector 54 is switched to the A side, multi-value output data from the still video player 53 is input to an image process unit 24-2. The data binarized by the unit 24-2 is supplied to a printer unit 44, and an image is output onto a copy sheet. Note that the input of the selector 54 is switched according to a switching signal output from a CPU 50 in accordance with an input from an input selection switch 52-3 provided on a console/display unit 52.

FIGS. 7A to 7C show image formation processes in a filing copy mode of still video images.

A filing mode is designated by a filing mode selection key 52-2 on the console/display unit 52, and the still video player 53 is selected as an image source by the input selection switch 52-3. An image to be output from the still video player 53 is determined in advance, and a copy start key 52-1 is turned on. Thus, in the first copy process, an image 401 is formed on a copy sheet 400 by three serial scan copy operations, as shown in FIG. 7A. In this case, the copy sheet is not ejected, and remains on a platen 45. At this time, when the copy start key 52-1 is not operated for a predetermined period of time (e.g., 10 minutes), the copy sheet is automatically ejected so as to prevent two pairs of rollers 28 and 29, and 30 and 31 from being deformed.

When the filing copy mode is to be ended, the copy sheet is ejected by operating a predetermined key indicated by an operation guide on the console/display unit.

When the filing copy mode is to be continued, an image to be output from the still video player 53 is changed, and the copy start key 52-1 is depressed, thus starting the second copy process. As shown in FIG. 7B, the copy sheet 400 is fed by a predetermined amount a, and an image 402 is formed on the copy sheet 400 by three serial scan operations. In this case, the copy sheet is not ejected, and remains on the platen 45.

In the third copy process, an image to be output from the still video player is changed, and the copy start key 52-1 is depressed as in the second copy process. Thus, as shown in FIG. 7C, the copy sheet 400 is fed by the predetermined amount a, and an image 403 is formed on the copy sheet 400 by three serial scan operations. When the copy sheet 400 has no print margin, it is ejected.

In this manner, a plurality of different still video images can be formed on a single sheet, and the sheet can be effectively utilized.

(Third Embodiment)

In the above embodiment, a plurality of images are formed on a single copy sheet on the basis of one of image data from the image reader 24-1 or image data from the still video player 53. However, both an image according to an original on the original table and an image from the still video player can be formed on a single copy sheet. In this case, after the end of image formation based on image data from one image source, the input of the selector 54 is switched by the input selection switch 52-3 to execute image formation based on imaged data from the other image source.

In the embodiments, of ink-jet recording systems, a system for discharging inks using bubbles generated by heat energy has been exemplified. However, the present invention is not limited to this. For example, a piezo system may be adopted.

The present invention is not limited to the ink-jet recording system. For example, the present invention can be applied to a thermal recording system using a thermal sheet, an ink sheet, or the like.

As to the representative construction and principle of the ink-jet recording system of this embodiment for discharging an ink using heat energy, for example, one practiced by use of the basic principle disclosed in, for instance, U.S. Pat. Nos. 4,723,129 and 4,740,796 is preferred. The above system is applicable to either one of the so-called on-demand type and the continuous type. Particularly, the case of the on-demand type is effective because, by applying at least one driving signal which gives rapid temperature elevation exceeding nucleus boiling corresponding to the recording information on electrothermal converting elements arranged in a range corresponding to the sheet or liquid channels holding liquid (ink), heat energy is generated by the electrothermal converting elements to effect film boiling on the heat acting surface of the recording head, and consequently the bubbles within the liquid (ink) can be formed in correspondence to the driving signals one by one. By discharging the liquid (ink) through a discharge port by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in accordance with characteristics. As the driving signals of such pulse shapes, the signals as disclosed in U.S. Pat. Nos. 4,463,359 and 4,345, 262 are suitable. Further excellent recording can be performed by using the conditions described in U.S. Pat. No. 4,313,124 of the invention concerning the temperature elevation rate of the above-mentioned heat acting surface.

As a construction of the recording head, in addition to the combined construction of a discharging orifice, a liquid channel, and an electrothermal converting element (linear liquid channel or right angle liquid channel) as disclosed in the above specifications, the construction by use of U.S. Pat. Nos. 4,558,333 and 4,459,600 disclosing the construction having the heat acting portion arranged in the flexed region is also included in the invention. The present invention can be also effectively constructed as disclosed in Japanese Laid-open Patent Appln. No. 59-123670 which discloses the construction using a slit common to a plurality of electrothermal converting elements as a discharging portion of the electrothermal converting element or Japanese Laid-open Patent Appln. No. 59-138461 which discloses the construction having the opening for absorbing a pressure wave of heat energy corresponding to the discharging portion. That is, recording can be reliably and efficiently performed regardless of the shape of the recording head.

Furthermore, the present invention can also be effectively applied to a full-line type recording head having a length corresponding to the maximum width of a recording medium, which can be used in a recording apparatus. In such a recording head, the length may be defined either by combining a plurality of recording heads, or by an integrally formed recording head.

As for the kinds and number of recording heads to be mounted, only one head may be arranged in correspondence with a monochrome ink, or a plurality of heads may be arranged in correspondence with a plurality of inks having different recording colors or densities.

As described above, a plurality of images can be recorded on a single recording medium without complicating an arrangement.

What is claimed is:

1. An image recording apparatus comprising:

recording means for recording an image of predetermined width on a recording medium;

convey means for conveying said recording medium by a predetermined amount so as to perform a sub-scan operation upon completion of a main scan operation by said recording means;

generation means for generating a recording start command; and control means for controlling said recording means and said convey means so as to record a first image and a second image on a same recording medium in response to a first recording start command and a second recording start command respectively generated from said generation means, wherein said control means controls said recording means and said convey means to: (1) perform the main scan operation and the sub-scan operation a number of times based upon the first image so as to record the first image in response to the first recording start command, (2) thereafter stop said recording medium without ejecting said recording medium from a recording position of said recording means, and (3) in response to the second recording start command, generated after the first image has been recorded, perform the main scan operation and the sub-scan operation a number of times based upon the second image so as to record the second image on the recording medium where the first image has been recorded, wherein said control means further controls said convey means to convey said recording medium by a predetermined amount before the start of recording of the second image after an end of recording of the first image, said control means being adapted to stop said recording medium in the recording position after conveyance of said recording medium by the predetermined amount.

2. An apparatus according to claim 1, wherein said control means operates said convey means to eject said recording medium when the second recording start command is not generated within a predetermined period of time after the conveying of said recording medium is stopped after the first image has been recorded in response to the first recording start command.

3. An apparatus according to claim 1, further comprising input means for inputting an eject command for ejecting said recording medium, and wherein said control means operates said convey means to eject said recording medium in response to the eject command input after the conveying of said recording medium is stopped after the first image has been recorded in response to the first recording start command.

4. An apparatus according to any one of claims 1 to 3, wherein said recording means comprises a recording head and moving means for moving said recording head in a main scan direction, and said convey means conveys said recording medium in a direction substantially perpendicular to the main scan direction.

5. An apparatus according to claim 4, wherein said recording head has a plurality of energy generation elements, and discharges an ink droplet by causing a change in state in an ink using energy generated by said energy generation elements.

6. An apparatus according to claim 5, wherein said energy generation elements generate heat energy.

7. An image recording apparatus comprising:
recording means for recording an image of predetermined width on a recording medium;
convey means for conveying said recording medium by a predetermined amount so as to perform a sub-scan operation upon completion of a main scan operation by said recording means;
generation means for generating a recording start command;
selection means for selecting a first mode or a second mode,
wherein in the first mode, an image is recorded during a single conveyance of said recording medium to a recording position of said recording medium, and
in the second mode, a plurality of images are recorded during the single conveyance of said recording medium to the recording position of said recording medium; and
control means for controlling said recording means and said convey means such that: (1) in the first mode, the main scan operation and the sub-scan operation are performed a number of times based upon an image to be recorded, in response to a recording start command generated from said generation means, and thereafter said recording medium is ejected from the recording position, and (2) in the second mode, the main scan operation and the sub-scan operation are performed a number of times based upon the first image to be recorded, in response to a first recording start command generated from said generation means, the recording medium is stopped at the recording position after the first image has been recorded, and in response to a second recording start command from said generation means, the main scan operation and the sub-scan operation are performed a number of times based upon the second image,
wherein said control means further controls said convey means to convey said recording medium by a predetermined amount before the start of recording of the second image after an end of recording of the first image, said control means being adapted to stop said recording medium in the recording position after conveyance of said recording medium by the predetermined amount.

8. An apparatus according to claim 7, further comprising means for setting arbitrary image information parameters before recording of the first and second images is started.

9. An apparatus according to claim 8, wherein when the set arbitrary image formation parameters do not correspond to the second mode, the arbitrary image information parameter setting means selects whether to eject said recording medium and set new arbitrary image formation parameters, or whether to cancel the new arbitrary image information parameters.

10. An apparatus according to claim 9, wherein said recording means comprises a recording head and moving means for moving said recording head in a main scan direction, and said convey means conveys said recording medium in a direction substantially perpendicular to the main scan direction.

11. An apparatus according to claim 10, wherein said recording head has a plurality of energy generation elements, and discharges an ink droplet by causing a change in state in an ink using energy generated by said energy generation elements.

12. An apparatus according to claim 11, wherein said energy generation elements generate heat energy.

13. An image recording apparatus, which comprises recording means for recording an image on a recording medium based upon input data, comprising:
convey means for conveying said recording medium by a predetermined amount so as to perform a sub-scan operation upon completion of a main scan operation by said recording means;
generation means for generating a recording start command;
first input means for inputting first data from a first data generation means;
second input means for inputting second data from a second data generation means;
selection means for selecting one of the first data and the second data input to said first and second input means, respectively, and outputting the data selected by said selection means to said recording means; and
control means for controlling said recording means and said convey means so as to record a first image based upon the first data and a second image based upon the second data on a same recording medium,
wherein said control means controls said recording means and said convey means to (1) perform the main scan operation and the sub-scan operation a number of times based upon one of the first image and the second image so as to record the first image or the second image in response to a first recording start command, (2) thereafter stop said recording medium without ejecting it from a recording position of said recording means, and (3) in response to a second recording start command generated after said recording medium has been stopped, perform the main scan operation and the sub-scan operation a number of times based upon the other of the first image and the second image,
wherein said control means further controls said convey means to convey said recording medium by a predetermined amount before the start of recording of the second image after an end of recording of the first image, said control means being adapted to stop said recording medium in the recording position after conveyance of said recording medium by the predetermined amount.

14. An apparatus according to claim 13, wherein said control means operates said convey means to eject said recording medium when the recording start command is not generated within a predetermined period of time after the recording medium is stopped from being conveyed by said convey means.

15. An apparatus according to claim 13, further comprising input means for inputting an eject command for ejecting said recording medium, and wherein said control means operates said convey means to eject said recording medium in response to the eject command input after the conveying of said recording medium is stopped after one of the first and second images has been recorded in response to the first recording start command.

16. An apparatus according to claim 13, wherein the first data generation means reads an original image, and outputs read image data.

17. An apparatus according to claim 13, the apparatus further comprising a storage medium for storing image data, wherein the second data generation means outputs image data previously stored in the storage medium.

18. An apparatus according to claim 13, wherein said recording means comprises a recording head and moving means for moving said recording head in a main scan direction, and said convey means conveys said recording medium in a direction substantially perpendicular to the main scan direction.

19. An apparatus according to claim 18, wherein said recording head has a plurality of energy generation elements, and discharges an ink droplet by causing a change in state in an ink using energy generated by said energy generation elements.

20. An apparatus according to claim 19, wherein said energy generation elements generate heat energy.

* * * * *